(12) United States Patent
Legrand et al.

(10) Patent No.: US 8,920,593 B2
(45) Date of Patent: Dec. 30, 2014

(54) METHOD FOR ATTACHING A HEADLESS RIVET NUT TO A SANDWICH PANEL

(71) Applicant: Thales, Neuilly-sur-Seine (FR)

(72) Inventors: Silvain Legrand, Nice (FR); Alain Mistral, Cannes la Bocca (FR); Damien Legloire, Nice (FR)

(73) Assignee: Thales, Neuilly sur Seine (FR)

( * ) Notice: Subject to any disclaimer, the term of this patent is extended or adjusted under 35 U.S.C. 154(b) by 64 days.

(21) Appl. No.: 13/871,184

(22) Filed: Apr. 26, 2013

(65) Prior Publication Data

US 2013/0284343 A1    Oct. 31, 2013

(30) Foreign Application Priority Data

Apr. 27, 2012    (FR) ...................... 12 01241

(51) Int. Cl.
*F16B 19/08* (2006.01)
*F16B 5/01* (2006.01)
*F16B 37/06* (2006.01)
*F16B 11/00* (2006.01)

(52) U.S. Cl.
CPC . *F16B 19/08* (2013.01); *F16B 5/01* (2013.01); *F16B 37/067* (2013.01); *F16B 11/006* (2013.01)
USPC .......... 156/293; 156/66; 156/294; 29/525.02; 29/524.1; 29/525.06; 29/34 B; 29/812.5; 29/243.521; 411/103; 411/108; 411/111; 411/113

(58) Field of Classification Search
CPC ............ F16B 5/01; F16B 19/08; F16B 37/04; F16B 37/06; F16B 37/062; F16B 37/065; F16B 37/067
USPC ............. 156/66, 293, 294; 29/525.02, 524.1, 29/525.06, 34 B, 812.5, 243.521; 164/112; 411/103, 108, 111, 113
See application file for complete search history.

(56) References Cited

U.S. PATENT DOCUMENTS

| 3,339,609 | A | * | 9/1967 | Cushman ..................... 411/82.1 |
| 3,355,850 | A | | 12/1967 | Rohe |
| 3,384,142 | A | | 5/1968 | Phelan |
| 2002/0050105 | A1 | | 5/2002 | McCorkle et al. |

FOREIGN PATENT DOCUMENTS

| BE | 679840 | | 10/1966 |
| DE | 1475131 | | 2/1970 |
| DE | 2759438 | | 12/1983 |
| EP | 1369599 | A1 | 12/2003 |
| WO | 2010/072009 | A1 | 7/2010 |

* cited by examiner

*Primary Examiner* — Jeff Aftergut
*Assistant Examiner* — Jaeyun Lee
(74) *Attorney, Agent, or Firm* — Baker Hostetler LLP

(57) ABSTRACT

The method and device provided herein relates to the field of screwed joints for panels and, in particular, for sandwich panels used in aerospace applications. It relates to a method for attaching a headless rivet nut to a wall of such a panel. The method comprises: injecting a predetermined quantity of adhesive into a blind hole made in the wall of the panel; fitting the headless rivet nut onto a rivet nut setting tool, the rivet nut setting tool comprising a pierced anvil and a mandrel passing through the anvil, the mandrel being screwed into the rivet nut so as to press the rivet nut onto the anvil; positioning the headless rivet nut in the blind hole, the anvil coming to press against the wall of the panel; setting the rivet nut so as to squeeze the wall of the panel between the anvil and a flange formed by deformation of the rivet nut.

9 Claims, 2 Drawing Sheets

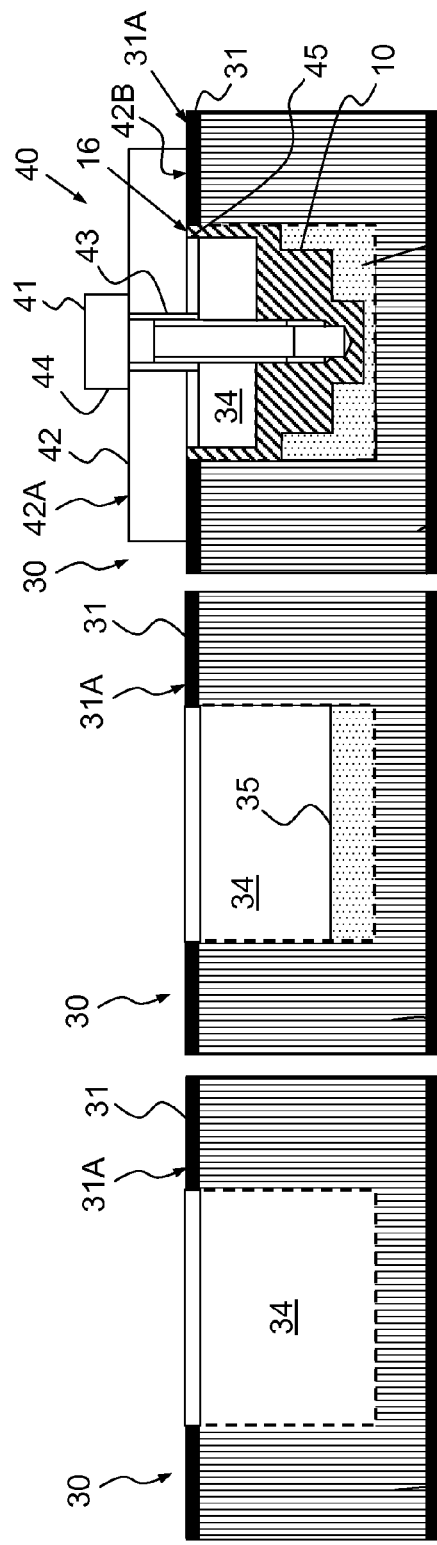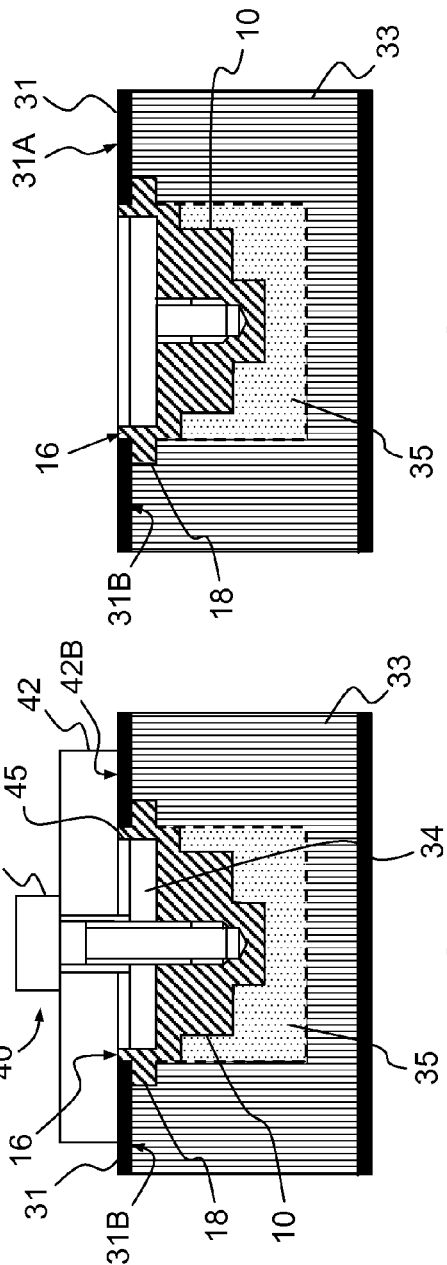

METHOD FOR ATTACHING A HEADLESS RIVET NUT TO A SANDWICH PANEL

CROSS-REFERENCE TO RELATED APPLICATION

This application claims priority to foreign French patent application No. FR 1201241, filed on Apr. 27, 2012, the disclosure of which is incorporated by reference in its entirety.

FIELD OF THE INVENTION

The invention relates to the field of screwed joints for panels and, in particular, for sandwich panels used in aerospace applications. It relates to a method for attaching a headless rivet nut to such a panel.

BACKGROUND

A sandwich panel is a panel comprising two generally parallel walls, which are held fixed in relation to one another by means of a core. The walls are relatively thin and may have a thickness of less than 1 millimeter. The walls are for example made of aluminium or carbon. The core of the sandwich panel may be an insulating foam or a honeycomb structure. Because of this structure, a sandwich panel cannot have tapped holes. This is because it is impossible to machine an internal thread either in walls that are this thin or in a foam or honeycomb structure. However, it is still necessary to have screwed joints in order to attach various elements to sandwich panels. One solution involves using rivet nuts, also called anchor nuts or thread inserts. A rivet nut comprises a cylindrical body, also called the stem, and a head, also called the collar, which extends in the radial direction at one end of the body. The head forms an annular contact surface for contact with the wall of the sandwich panel. A bore extends axially inside the body from the head. The bore can be blind or open-ended. The body comprises a portion in which the bore has a tapped thread and a portion which is deformable.

The procedure for installing a rivet nut in a wall of a sandwich panel is as follows. In a first step, a blind hole is machined in the wall of the panel. The diameter of the hole is substantially equal to the outer diameter of the body. In a second step, the rivet nut is screwed onto the threaded shank of a rivet nut setting tool and positioned in the hole in the wall, the collar coming to press against the wall of the panel. The nut is then set, the rivet nut setting tool exerting a tensile force on the tapped portion of the rivet nut in the direction of the collar. The rivet nut setting tool can then be unscrewed from the rivet nut. After setting, the deformable portion of the body of the nut forms a flange which comes to press against the internal surface of the wall of the sandwich panel. The rivet nut is thus attached to the wall in that it squeezes the wall between the flange and the collar of the rivet nut. A rivet nut is described as blind if it is attached from just one side of the wall.

One problem with rivet nuts is that their collar protrudes from the surface of the panel wall. This protrusion prevents the surface of the panel wall from being brought into contact with an element to be attached thereto. Direct contact of this type may be desirable in order to distribute the transmission of forces between the panel and the element attached thereto, or in order to increase thermal exchanges between the parts. Rivet nuts which reduce the thickness of the protrusion, specifically countersunk rivet nuts and rivet nuts having low-profile heads, are available. These two types of nut have a countersunk head which becomes embedded in the wall of the panel by local deformation during setting. Nonetheless, even with rivet nuts having low-profile heads, also called slender head rivet nuts, it is impossible to completely negate the protrusion. However, in certain fields, such as astronautics, flush tolerances can be of the order of a tenth of a millimeter. Furthermore, given that the annular width of the collar of countersunk nuts and nuts having low-profile heads is smaller than that of flat-headed nuts, the resistance of these nuts to being pushed inside the panel is reduced.

It is possible to reinforce this push-through resistance by injecting adhesive into the panel at the location of the rivet nut. Where a honeycomb sandwich panel is concerned, the quantity of adhesive to be injected in order to completely embed the rivet nut is difficult to estimate. In particular, creating the blind hole can have opened a plurality of cells of the honeycomb. One solution is to create two additional holes near the rivet nut. A first hole is used for injecting adhesive, and a second hole acts as a vent. Adhesive is injected through the first hole until it starts to emerge from the other. This method presents the notable drawback that additional holes must be machined. This therefore increases the time required for installing the rivet nut. Moreover, the holes weaken the panel and can present leaktightness problems. One other drawback is that the adhesive which has overflowed from the second hole must be cleaned off the panel.

SUMMARY OF THE INVENTION

It is a notable object of the invention to provide a solution to all or some of the aforementioned drawbacks by making it possible for a headless rivet nut to be installed in a sandwich panel while at the same time making sure that it is held there. To that end, the invention relates to a method for attaching a headless rivet nut to a wall of a panel comprising a blind hole, the method comprising the following steps:
  injecting a predetermined quantity of adhesive into the blind hole;
  fitting the headless rivet nut onto a rivet nut setting tool, the rivet nut setting tool comprising a pierced anvil and a mandrel passing through the anvil, the mandrel being designed to be screwed into the rivet nut so as to press one end of the rivet nut onto a surface of the anvil;
  positioning the headless rivet nut in the blind hole, the surface of the anvil which is pressed against the end of the rivet nut coming to press against the wall of the panel;
  setting the rivet nut so as to squeeze the wall of the panel between the anvil and a flange formed by deformation of the rivet nut.

According to one particular embodiment, the adhesive is a foaming adhesive, the injected quantity being determined so as to fill, after polymerization, the empty space left in the blind hole by the rivet nut.

The panel comprises, for example, a core having a honeycomb structure.

The method can comprise the following additional steps after the setting step:
  polymerizing the adhesive such that it is rigid enough to hold the rivet nut pressed against the wall of the panel;
  removing the rivet nut setting tool from the rivet nut once the adhesive has polymerized.

According to one particular embodiment, the rivet nut comprises a cylindrical stem and a bore inside the stem so as to form a deformable portion, the anvil comprising a shoulder which engages inside the bore during the fitting step so as to prevent the flange from being formed towards the inside of the bore.

One notable advantage of the invention is that it makes it possible to simplify the installation of rivet nuts. The number of steps required and the installation time are reduced.

BRIEF DESCRIPTION OF THE DRAWINGS

The invention will be better understood and other advantages will become clear upon reading the description below with reference to the appended drawings, in which:

FIGS. 3A to 3E show a sandwich panel at various stages of the attaching method according to the invention.

DETAILED DESCRIPTION

Figure 1:
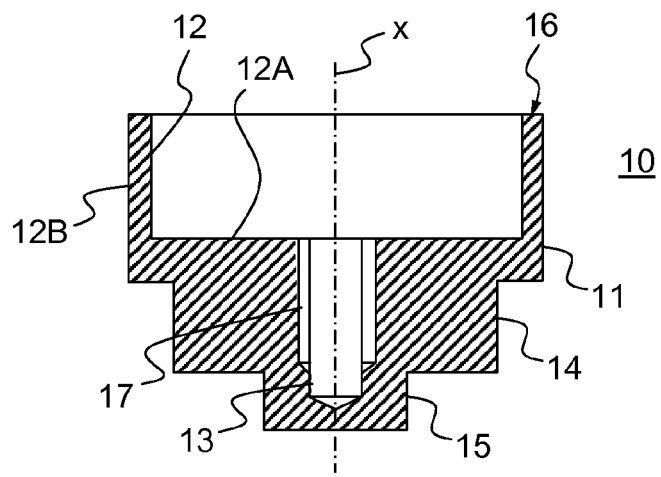
FIG. 1 shows an example of a headless rivet nut used in the attaching method according to the invention.

FIG. 1 shows an example of a headless rivet nut according to the invention. The rivet nut 10 comprises a stem 11 in the form of a cylinder of revolution about an axis X, a first bore 12 extending over a first longitudinal part of the stem 11, a second bore 13 extending over a second longitudinal part of the stem 11 from the base 12A of the first bore 12, and shoulders 14 and 15 on third and fourth longitudinal parts, respectively. The diameter of the first bore 12 is slightly smaller than the external diameter of the stem 11. The bore 12 thus forms a deformable portion 12B for the rivet nut 10. This deformable portion 12B ends at an annular surface 16 at one end of the stem 11. The diameter of the second bore 13 is smaller than the diameter of the first bore 12. The bore 13 comprises a tapped portion 17 which extends from the base 12A of the first bore 12. According to the invention, the rivet nut is headless, that is to say that it has no collar extending in the radial direction at one end. Thus, the maximum external diameter of the rivet nut corresponds to the maximum diameter of the stem.

In the exemplary embodiment of FIG. 1, the outer shape of the stem is a cylinder of revolution. Nonetheless, the stem can be in the shape of a simple cylinder, for example square or hexagonal. The stem of the rivet nut can also comprise longitudinal striations on its outer surface, over its entire length or only part thereof.

Figure 2:
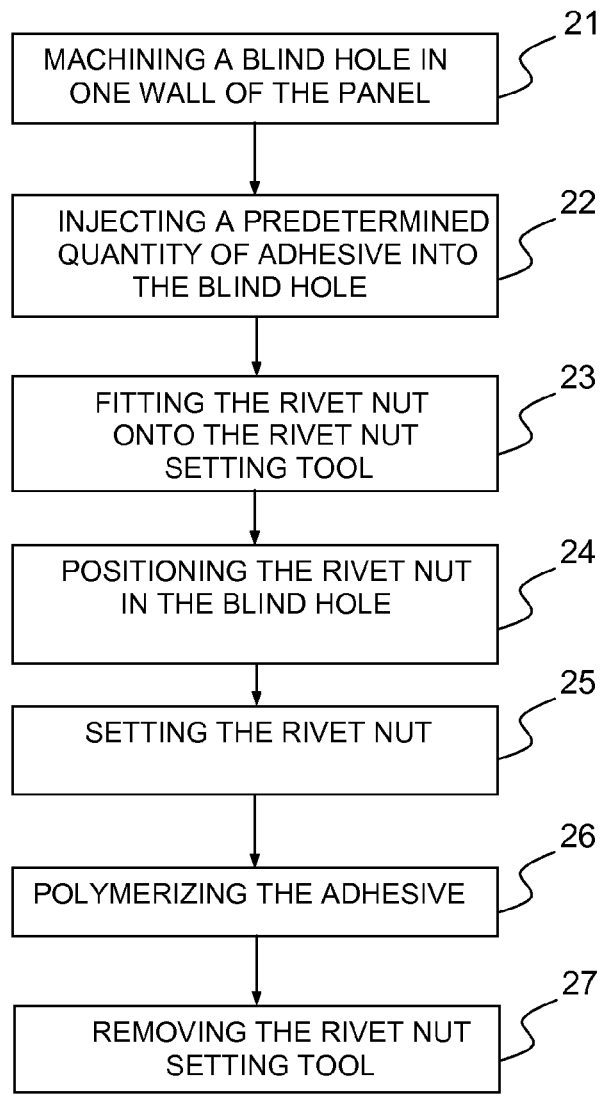
FIG. 2 shows an example of steps of the method for attaching a rivet nut to a sandwich panel according to the invention.

FIG. 2 shows an example of steps of the method for attaching a headless rivet nut to a sandwich panel according to the invention. A sandwich panel, comprising two walls held fixed in relation to one another by means of a core, is considered in general terms. In a first step 21, a blind hole is machined in one of the walls of the sandwich panel. In a second step 22, a predetermined quantity of adhesive is injected into the blind hole. The adhesive is preferably a foaming adhesive, that is to say one which expands as it polymerizes. Thus, it can fill a variable volume, specifically the space of the blind hole left empty by the rivet nut. In a third step 23, a headless rivet nut, for example the rivet nut 10 described with reference to FIG. 1, is fitted onto a rivet nut setting tool. The rivet nut setting tool according to the invention notably comprises a mandrel and an anvil. The anvil is pierced so as to allow the mandrel to pass through it. The external diameter of the anvil is greater than the diameter of the blind hole. The anvil thus has the appearance of a washer. During step 23, the rivet nut 10 is fitted onto the rivet nut setting tool by screwing the mandrel into the tapped portion 17 of the nut until the anvil is compressed between the mandrel head of the rivet nut setting tool and the annular surface 16 of the stem 11. In a fourth step 24, the rivet nut 10 is positioned in the blind hole of the sandwich panel such that the surface of the anvil which is in contact with the annular surface 16 of the stem 11 is also in contact with the outer surface of the wall in which the blind hole has been machined. Thus, the end of the rivet nut 10 is perfectly flush with the outer surface of the wall. In a fifth step 25, the rivet nut 10 is set. Setting consists in pulling on the tapped portion 17 of the rivet nut 10 along its longitudinal axis X towards the rivet nut setting tool. This tensile force is exerted by means of the mandrel of the rivet nut setting tool and results in the deformable portion 12B deforming plastically to an annular flange which presses against the inner surface of the wall of the panel. In a sixth step 26, the adhesive is polymerized. Polymerizing the adhesive makes it possible to hold the rivet nut relative to the sandwich panel such that it is prevented from falling into the open hole. Finally, in a seventh step 27, the rivet nut setting tool is removed from the rivet nut by unscrewing the mandrel.

FIGS. 3A to 3E show a sandwich panel at various stages of the method for attaching a headless rivet nut according to the invention. In these figures, a sandwich panel 30, comprising two parallel walls 31 and 32 which are held fixed in relation to one another by means of a honeycomb core 33, is considered. FIGS. 3A and 3B show, respectively, the sandwich panel 30 following the step 21 of machining a blind hole and following the step 22 of injecting adhesive. The blind hole 34 is made in the wall 31. Adhesive 35 is injected into the blind hole 34 through the opening thereof. FIG. 3C shows the sandwich panel 30 with the rivet nut 10 of FIG. 1 and a rivet nut setting tool 40 following step 24. The rivet nut setting tool 40 notably comprises a mandrel 41 and an anvil 42. The anvil 42 is for example in the shape of a circular cylinder and comprises at its centre an open-ended bore 43 through which the mandrel 41 passes. The mandrel 41 comprises a head 44 which presses against a first surface 42A of the anvil 42. A surface 42B of the anvil 42, on the other side from the surface 42A, simultaneously presses against the annular surface 16 of the stem 11 and the outer surface 31A of the wall 31. FIG. 3D shows the sandwich panel 30 with the rivet nut 10 following the setting step 25. The tensile force exerted by the mandrel 41 causes the deformable portion 12B to deform plastically to an annular flange 18, one surface of which is pressed against the inner surface 31B of the wall 31. The wall 31 is then compressed between the annular flange 18 and the anvil 42. Where applicable, walls of the honeycomb structure 33 can become locally deformed by the radial thrust of the flange 18. During step 26, the adhesive 35 is polymerized and thus makes it possible to hold the rivet nut 10 pressed against the inner surface 31B of the wall 31. If the adhesive is a foaming adhesive and is injected in sufficient quantity, it expands so as to fill all the empty space surrounding the rivet nut 10. Once the adhesive has polymerized, the rivet nut setting tool 40 is removed from the rivet nut 10 by unscrewing the mandrel 41. The end of the rivet nut 10, in this case the annular surface 16, is thus perfectly flush with the outer surface 31A of the wall 31.

According to one particular embodiment, shown in FIGS. 3C and 3D, the anvil 42 of the rivet nut setting tool 40 comprises a shoulder 45 which engages in the bore 12 of the rivet nut 10. This shoulder 45 makes it possible, on one hand, to centre the anvil 42 relative to the blind hole 34 and, on the other hand, to prevent the deformable portion 12B from forming a flange towards the inside of the bore 12.

The invention claimed is:

1. A method for attaching a headless rivet nut to a wall of a panel comprising a blind hole, comprising:
   injecting a predetermined quantity of adhesive into the blind hole;
   fitting the headless rivet nut onto a rivet nut setting tool, the rivet nut setting tool comprising a pierced anvil and a mandrel passing through the anvil, the mandrel being designed to be screwed into the rivet nut so as to press one end of the rivet nut onto a surface of the anvil;
   positioning the headless rivet nut in the blind hole, the surface of the anvil which is pressed against the end of the rivet nut coming to press against the wall of the panel;
   setting the rivet nut so as to squeeze the wall of the panel between the anvil and a flange formed by deformation of the rivet nut.

2. The method according to claim 1, wherein the adhesive is a foaming adhesive, the injected quantity being determined so as to fill, after polymerization, the empty space left in the blind hole by the rivet nut.

3. The method according to claim 1, the panel comprising a core having a honeycomb structure.

4. The method according to claim 2, the panel comprising a core having a honeycomb structure.

5. The method according to claim 1, in which the rivet nut comprises a cylindrical stem and a bore inside the stem so as to form a deformable portion, the anvil comprising a shoulder which engages inside the bore during the fitting step so as to prevent the flange from being formed towards the inside of the bore.

6. The method according to claim 2, in which the rivet nut comprises a cylindrical stem and a bore inside the stem so as to form a deformable portion, the anvil comprising a shoulder which engages inside the bore during the fitting step so as to prevent the flange from being formed towards the inside of the bore.

7. The method according to claim 3, in which the rivet nut comprises a cylindrical stem and a bore inside the stem so as to form a deformable portion, the anvil comprising a shoulder which engages inside the bore during the fitting step so as to prevent the flange from being formed towards the inside of the bore.

8. The method according to claim 4, in which the rivet nut comprises a cylindrical stem and a bore inside the stem so as to form a deformable portion, the anvil comprising a shoulder which engages inside the bore during the fitting step so as to prevent the flange from being formed towards the inside of the bore.

9. The method according to claim 1, further comprising the following additional steps after the setting step:
   polymerizing the adhesive such that it is rigid enough to hold the rivet nut pressed against the wall of the panel;
   removing the rivet nut setting tool from the rivet nut once the adhesive has polymerized.

* * * * *